G. R. Griffith.
Rafting.
Nº 2,267.      Patented Sep. 25, 1841.
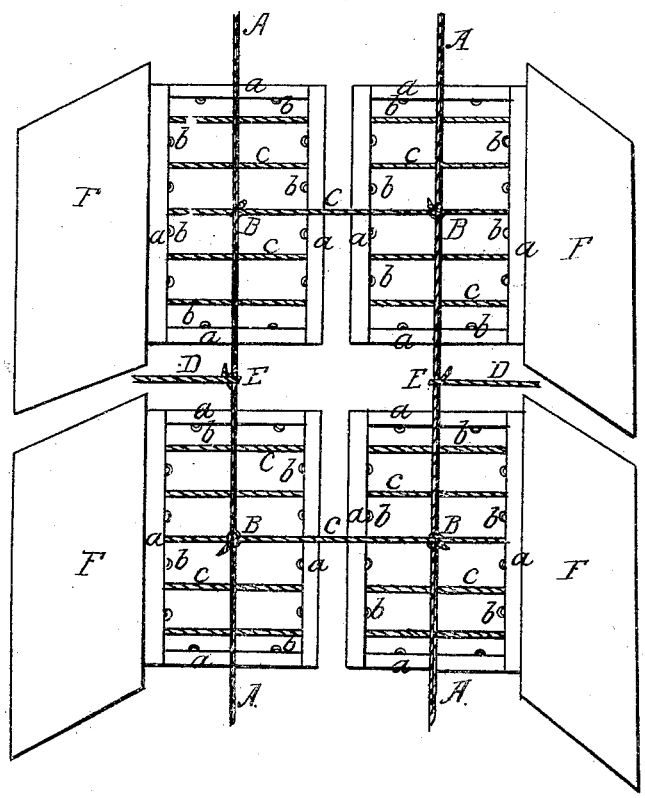

UNITED STATES PATENT OFFICE.

GEORGE R. GRIFFITH, OF MOBILE, ALABAMA.

METHOD OF TRANSPORTING BALES OF COTTON TO MARKET BY FLOATING THEM IN THE FORM OF RAFTS.

Specification forming part of Letters Patent No. 2,267, dated September 25, 1841.

*To all whom it may concern:*

Be it known that I, GEORGE R. GRIFFITH, of the city of Mobile and State of Alabama, have invented a new and Improved Method of Transporting Bales of Cotton by Floating them on Water, by which improvement they may be readily conveyed to market at seasons when the ordinary conveyance by means of steamboats, flat-boats, or other vessels must necessarily fail from the low state of the water in the rivers which are navigated by them; and I do hereby declare that the following is a full and exact description of my said invention.

The first part of my invention consists in securing each bale of cotton against the introduction of water by means of a case or envelope, of india-rubber or other water-proof cloth, which shall contain the bale, covering its bottom and its sides, and when required, on account of rain, covering it at top also. Around the upper edges of these cases or envelopes I affix rings or loops in such number and so situated as shall enable me to attach the respective cases to a bale of cotton by means of cords or strings.

The second part of my invention consists in the manner in which I combine any desired number of such bales together, so as to form them into a raft, the extent of which will be limited only by its capacity of being managed with convenience, but which may be as extensive as the rafts of timber which descend the same rivers, while they may be navigated at periods when timber rafts cannot, as such bales will not usually have a draft of more than eight or nine inches of water, and the raft which they compose will from its flexibility yield in shoal places where rafts of timber would be arrested.

In forming my bales so prepared into rafts I commence by uniting a double row of them together by means of cords, as shown in the accompanying drawing, in which I have represented the upper sides of four bales joined together in such manner as will enable me to describe the method of connecting any larger number. The bales are placed in their respective water-proof cases, the upper edges of which are shown at *a a a a* lapping over the upper side of the bale, and furnished with rings or loops at *b b b*, through which strings may be passed to keep them in place. The baling-ropes are shown at *c c c*.

A A are ropes which are to be extended along a series of bales placed end to end and which may be fastened to the baling-ropes at B B or elsewhere. To connect two series of bales which have been thus united longitudinally by means of the ropes A A, other ropes or cords may be carried across from the middle of one bale to the middle of another, as shown at C C, and so along the whole series. A raft consisting of two bales in width and of any desired number in length may be thus formed. To unite these to similar rafts, I extend ropes D D, attached to the ropes A A at the points E E between the ends of two bales, to another rope employed like A A in uniting a series of bales endwise, and in this way any number of the rafts first formed and consisting of pairs of bales may be readily combined and united.

F F are covers of water-proof cloth, which are united to the water-proof cases by one edge. The use of these is to cover the upper sides of the bales in the case of heavy rains. These covers are at other times rolled up, so as to leave the bagging of the bales exposed, a better footing for managing the rafts being in this way afforded than by the covers F F, while the latter are also preserved from being unduly worn. When these covers are thrown over the bales, they hang down between them and turn off the rain. The use of these will show the propriety of connecting the respective rafts of pairs of bales by the ropes D D between their ends, as said ropes could not pass across the bales without passing through the covers F F.

In narrow passes on a river the rafts may be readily reduced in width—say to that of two bales, if desired—by removing the ropes D D, and to facilitate the doing of this the ends of these ropes may be furnished with hooks or clasps, which may be cast off and replaced instantaneously.

Having thus fully described the nature of my invention and shown the manner in which I carry the same into operation, what I claim therein as new, and desire to secure by Letters Patent, is—

The forming or constructing of rafts of bales of cotton by combining said bales together in the manner herein set forth—that is to say, by first providing each separate bale with a case or envelope of water-proof cloth made and attached thereto in the manner described, and attaching said bales to each other so as to form a narrow raft consisting of pairs of bales by ropes running along the whole line and by other ropes crossing from bale to bale, as herein described, and the uniting of these rafts of pairs laterally by means of ropes between the separate pairs of bales to any required extent; and I do hereby declare that I do not intend to confine or limit myself to the precise manner of attachment herein represented and made known, but to vary this as I may think proper while I attain the same end by means substantially the same.

G. R. GRIFFITH.

Witnesses:
    THOS. P. JONES,
    JOS. A. ANDREWS.